United States Patent Office 3,642,639
Patented Feb. 15, 1972

3,642,639
PROCESS OF REFRIGERATION USING MIXTURE SF₆ AND CHClF₂
Kevin P. Murphy, Bernardsville, and Richard F. Stahl, Madison, N.J., assignors to Allied Chemical Corporation, New York, N.Y.
No Drawing. Filed Nov. 21, 1968, Ser. No. 777,897
Int. Cl. C09k 3/02
U.S. Cl. 252—67    4 Claims

ABSTRACT OF THE DISCLOSURE

Monochlorodifluoromethane ($CHClF_2$) and sulfur hexafluoride ($SF_6$), in certain proportions, form mixtures having unusually high refrigeration capacity and which are therefore especially adapted for use as refrigerants in high capacity, low temperature refrigeration systems.

BACKGROUND OF THE INVENTION

Sulfur hexafluoride ($SF_6$) is a known refrigerant (U.S. Pat. 1,778,033). The lower aliphatic hydrocarbons, when substituted by fluorine and chlorine, are well known to have potential as refrigerants (U.S. Pat. 1,968,049). Many of these halocarbon materials exhibit certain desired properties for refrigeration purposes including low cost, low specific volume, low toxicity and non-flammability, which characteristics have resulted in the extensive use of such compounds in a large number of refrigeration applications. Examples of such compounds include dichlorodifluoromethane ($CCl_2F_2$), B.P. −21.6° F.; chlorodifluoromethane ($CHClF_2$), B.P. −41.4° F.; fluorodichloromethane ($CHCl_2F$), B.P. 48.1° F.; fluorotrichloromethane ($CCl_3F$), B.P. 78.4° F., tetrafluorodichloroethane ($CClF_2CClF_2$), B.P. 38.4° F. and trifluoromethane ($CHF_3$), B.P.−119.9° F.

While these chloro-fluoro derivatives provide an adequate range of refrigerants for many purposes, only a very few exhibit sufficiently high refrigeration capacities to offer any significant potential as low temperature refrigerants.

A large number of refrigerants of different capacities are required to permit flexibility of design and the art is continually faced with the problem of providing new refrigerants as the need arises for new capacities and types of installations.

It is well known that refrigeration capacity is largely a function of the vapor pressure of the refrigerant at the evaporating temperature. Accordingly, it would be logical in seeking refrigerants possessing higher capacities to study those exhibiting higher vapor pressures. The use of higher pressure refrigerants, however, requires the use of heavier and more costly equipment components to maintain the desired safety margins. Any refrigerant composition which could produce an increase in capacity without a corresponding increase in operating pressures, while possessing other desirable refrigeration properties, would be highly valuable to the industry.

An object of this invention is to provide a novel range of refrigerant mixtures which possess significantly higher capacity levels than $SF_6$ but which can be used in refrigeration systems with lower or no significantly higher operating pressures than would be required for $SF_6$ alone.

It is another object of the present invention to provide new compositions especially suitable for use as low temperature refrigerants.

Another object of the invention is to provide non-flammable, low boiling refrigerant compositions having high refrigeration capacities.

Other objects and advantages of the invention will become apparent from the following description.

SUMMARY OF THE INVENTION

In accordance with the invention, it has been discovered that mixtures consisting of monochlorodifluoromethane ($CHClF_2$, B.P. −41.4° F.) and sulfur hexafluoride ($SF_6$, B.P. −58° F.) containing about 35–92 mol percent $SF_6$, although possessing vapor pressures intermediate the vapor pressures of the individual components depending on concentration, as would be expected; said mixtures possess refrigeration capacities which are significantly higher than the refrigeration capacities of either of the $CHClF_2$ or $SF_6$ components alone. This latter property is highly unexpected, particularly when considered in the light of the vapor pressure characteristics of these mixtures. The phenomenon which results in the unusually high refrigerating capacities is not understood.

Mixtures as defined above in which the $SF_6$ component is present in a molar percentage between about 40–60 are preferred, since such mixtures possess freezing points below about 100° C., which is preferred for some refrigeration applications. Still preferred are mixtures as defined above in which the molar percentage of $SF_6$ is between about 48–52. A preferred mixture is one in which the molar percentage of $SF_6$ is about 50.

A further unexpected property of the mixtures falling within the scope of the invention is that the compression ratios of said mixtures are lower than those of the individual mixture components alone. This has practical significance in terms of higher volumetric efficiency of the compressor and longer compressor life.

The mixtures of the invention may be employed to produce refrigeration in a conventional manner by condensing the mixtures and thereafter evaporating said mixtures in the vicinity of a body to be cooled.

The mixtures of the invention may also be employed for other applications such as for aerosol propellants, power cycle fluids, gaseous dielectrics, heat transfer media and low temperature solvents.

EXAMPLE

The refrigeration capacity and compression ratio of an illustrative mixture within the scope of the invention were compared with those properties of the mixture components. The cycle conditions for the comparison were: condensing temperature, 86° F.; evaporating temperature, −31° F. and suction gas temperature, 65° F. The comparative results are indicated below:

|  | $CHClF_2$ | $SF_6$ | 50 mol percent $CHClF_2$/50 mol percent $SF_6$ |
|---|---|---|---|
| Evaporator pressure (p.s.i.a.) | 19.1 | 60.2 | 55.4 |
| Condenser pressure (p.s.i.a.) | 173 | 385 | 338 |
| Compression ratio | 9.05 | 6.40 | 6.10 |
| Capacity (cu. ft./min. per ton) | 8.28 | 4.4 | 3.10 |
| Relative capacity | 100 | 188 | 267 |

The above data show that the 50 mol percent $CHClF_2$/50 mol percent $SF_6$ mixture has 267% of the capacity of $CHClF_2$ alone. The 50 mol percent $CHClF_2$/50 mol percent $SF_6$ mixture has 142% of the capacity of $SF_6$ alone. These figures are particularly surprising when it is observed, as shown by the above data, that the operating pressures during use of the $CHClF_2/SF_6$ mixture are intermediate the operating pressures when either $CHClF_2$ or $SF_6$ are used alone.

As can further be seen from the above data, the subject mixture also exhibits a lower compression ratio than either of the mixture components.

Mixtures of $CHClF_2$ and $SF_6$ in accordance with the invention in which the $SF_6$ concentration varies over the entire range of about 35–92 mol percent, all exhibit higher refrigeration capacities and lower compression ratios than either of the components.

We claim:

1. The process of producing refrigeration which comprises condensing a mixture consisting essentially of $CHClF_2$ and $SF_6$ in which the mol percent of $SF_6$ is in the range of about 35–92 and thereafter evaporating said mixture in the vicinity of the body to be cooled.

2. The process according to claim 1 in which the mixture contains about 40–60 mol percent of $SF_6$.

3. The process according to claim 1 in which the mol percent of $SF_6$ is in the range of about 48–52.

4. The process according to claim 1 in which the mol percent of $SF_6$ is about 50.

References Cited

UNITED STATES PATENTS 2,641,579   7/1953   Benning _____ 252—67

OTHER REFERENCES

Chemical Abstracts, vol. 54, col. 4601g; vol. 61, col. 13892b.

JOHN D. WELSH, Primary Examiner

U.S. Cl. X.R.

62—114; 252—30 S